M. RAPP.

STRAW SPREADING MACHINE.

APPLICATION FILED MAY 26, 1919.

Reissued Aug. 19, 1919.

14,715

3 SHEETS—SHEET 1.

INVENTOR

Mathew Rapp,

Chas. W. Porte,

ATTORNEY.

M. RAPP.
STRAW SPREADING MACHINE.
APPLICATION FILED MAY 26, 1919.
Reissued Aug. 19, 1919.
14,715.
3 SHEETS—SHEET 2.
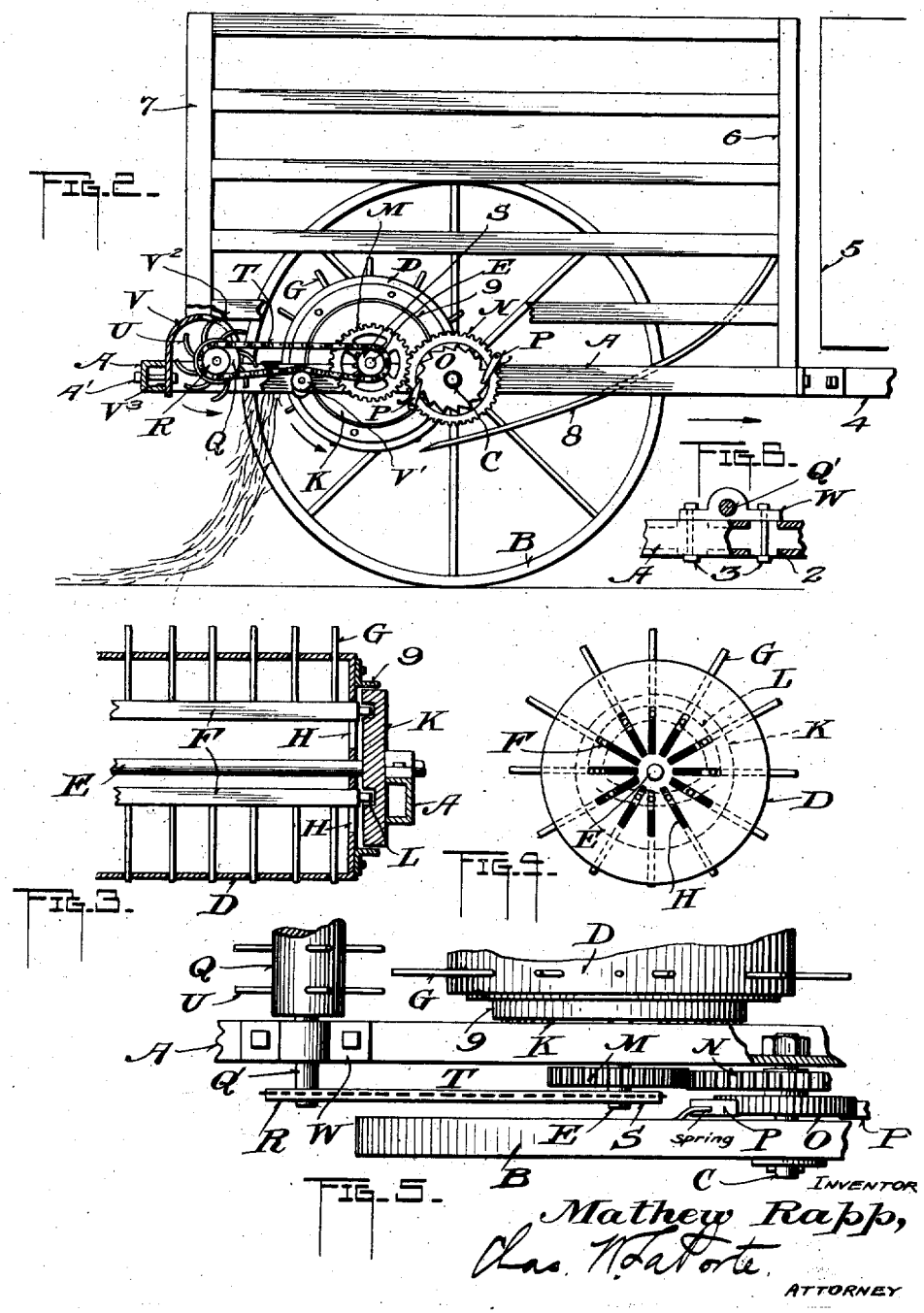

M. RAPP.

STRAW SPREADING MACHINE.

APPLICATION FILED MAY 26, 1919.

Reissued Aug. 19, 1919.

14,715.

3 SHEETS—SHEET 3.

Inventor

Mathew Rapp,

By Chas. W. Porter,

Attorney

UNITED STATES PATENT OFFICE.

MATHEW RAPP, OF MORTON, ILLINOIS.

STRAW-SPREADING MACHINE.

14,715. Specification of Reissued Letters Patent. Reissued Aug. 19, 1919.

Original No. 1,282,946, dated October 29, 1918, Serial No. 148,604, filed February 14, 1917. Application for reissue filed May 26, 1919. Serial No. 299,986.

*To all whom it may concern:*

Be it known that I, MATHEW RAPP, a citizen of the United States, residing at Morton, in the county of Tazewell and State of Illinois, have invented certain new and useful Improvements in Straw-Spreading Machines, of which the following is a specification.

This invention relates to improvements in farm implements of that class used for distributing or spreading materials such as straw, manure, and other protecting and fertilizing materials.

The machine of my invention is particularly adapted for the spreading of straw as will appear from the accompanying description.

Straw spreaders are now demanded by agriculturists whose requirements is a machine that will spread the material as evenly as possible and of any desired thickness depending upon the purpose for which the straw is intended.

When straw is merely utilized as a fertilizer to be plowed under the layer laid down may be comparatively thin but when it is desired that it should constitute a winter covering for protecting wheat from frost the layer is preferably much thicker.

It is quite well known that in the absence of snow as a protection for the wheat plants the process of thawing and freezing throughout the winter is very injurious and affects the future yield of grain.

In order that the best conditions can be maintained, therefore, it is desired to lay down an even layer of the straw without unnecessary waste and at the same time it is the wish to govern the thickness of the same according to conditions and localities.

The main object of the invention is to provide a wheeled trailer attachment to a wagon or the like, which attachment is a self-contained or complete unit, *i. e.*, embodies straw-spreading means operated by or from the wheels of the trailer.

A further object of the invention is to provide a trailer attachment which is complete in itself, so as to require simple or mere attachment to the wagon and upon completion of this attachment to be in complete operative condition, *i. e.*, upon movement of the wagon to perform its straw-spreading functions.

Still further, the invention aims to provide an attachment which permits of the use of a hopper, of length preferably in excess of the width of the towing device carrying the material supply, thereby to increase the width of the straw layer so as to facilitate spreading.

One of the objects of my invention, therefore, is to furnish a straw spreader of simple construction consisting of operating elements so disposed as to produce the very best results in practice.

Another object is to provide a pair of cylinders operating together in such a way as to lay down an even layer of straw.

Another object is to provide a machine involving a pair of toothed cylinders operating together to lay down an even layer of straw and provide means for adjusting one of them in the direction of the other, whereby to lay down a layer of material of any desired thickness.

Still another object is to provide in a straw-spreader, a pair of cylinders operating in conjunction for positively and evenly spreading the straw in an even layer of any desired thickness, the structure including means by which the teeth of the cylinder will be cleared of the straw and prevent "wrapping" of the same.

Another object is to furnish a pair of rotating cylinders operating in conjunction, the teeth of one of which will be automatically drawn into it whereby the straw will be prevented from wrapping upon said cylinder, and will be readily discharged, all of said teeth being afterward moved out into operating position.

Other objects and advantages will appear as the description proceeds.

The accompanying drawing illustrates one of the embodiments of my invention, it being understood that changes may be made therein without departing from the inventive idea.

Fig. 2 is a side elevation of the machine,

Fig. 3 is a vertical longitudinal section through a part of a main cylinder;

Fig. 4 is an end elevation of the cylinder shown in Fig. 3, showing a cam plate in dotted lines;

Fig. 5 is a plan of a part of the machine as illustrated in Fig. 1, produced on a much smaller scale;

Fig. 6 is a detail of means for adjusting one of the cylinders upon the machine frame;

Figure 1:
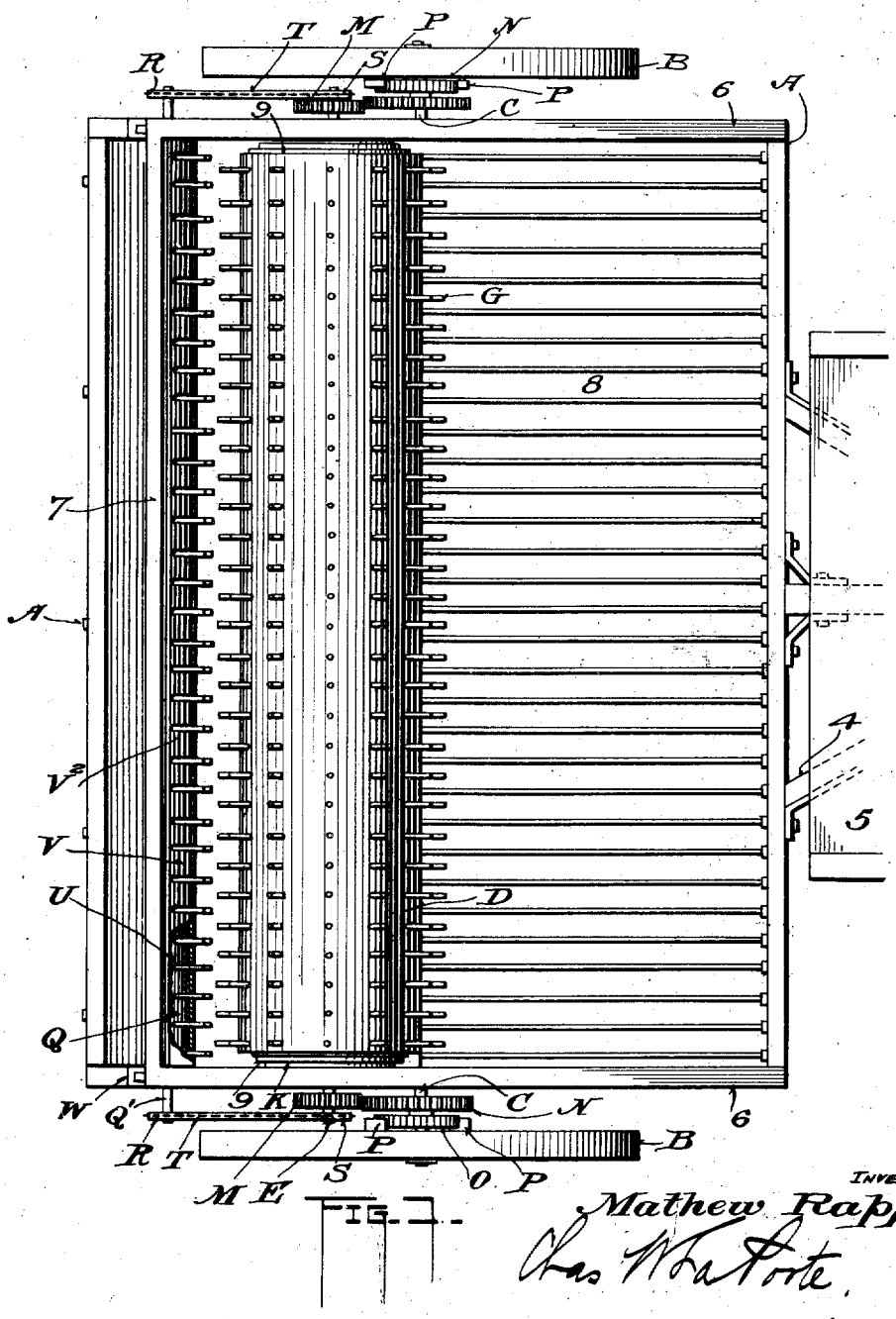
Figure 1 is a plan of my improved straw-spreader.
Figure 7:
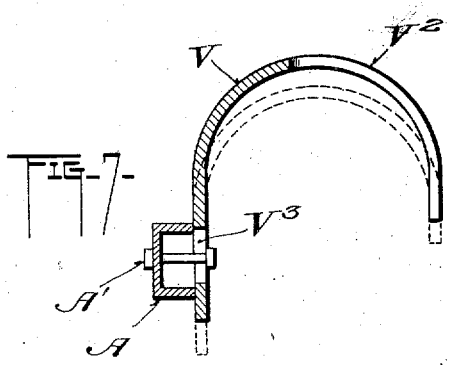
Fig. 7 is an enlarged sectional elevation of parts shown in Fig. 2.

A represents the main frame of the machine and B the supporting wheels which carry the frame by means of stub axles, for example, which may consist of a stud C secured to and projecting from opposite ends of the said frame.

D is a cylinder rotated by and suitably secured to a shaft E journaled on the frame in any approved manner, the ends projecting beyond the frame to receive certain gearing to be described.

Straw varies in length and in texture, the latter quality depending on whether it is wheat, oats, or rye straw. Some is very tough and when of this nature and quite long, tends to wrap around rotating parts which in the present instance would be the described cylinder D and this wrapping is aided by the teeth of said cylinder. Shorter straw, however, and straw that is easily broken does not as readily produce this trouble.

In order to better assist in the proper operation of my machine and adapt it to all kinds of straw, I preferably so mount the teeth that as they approach the under side of the cylinder during its rotation, they are drawn into it thereby stripping them, leaving the straw free to discharge by gravity, the cylinder being thus kept free and clear at all times.

While there are several methods of thus operating the teeth I have shown one herein which serves the purpose and may be understood from the following:

F indicates a series of bars paralleling the shaft E and lying within the cylinder and provided with straight teeth G extending through the shell of the cylinder. The ends of the rods extend through spaced radial slots H in the ends of the cylinder as shown in Fig. 3.

K is a plate secured inside each end of the frame A, the ends of the cylinder lying adjacent thereto. Each of said plates is furnished with a groove L substantially the upper half of which is described from the axis of rotation of the cylinder and concentric with the shaft. The lower half of the groove or that beneath the shaft E is part of a circle having a much longer radius than that of the upper half as clearly shown in Fig. 4. This part of the curve lies quite close to the said shaft forming what may be termed a cam-track into which the ends of the bars F extend and which, though not so shown, may each be provided with any form of anti-friction device such as a roller.

In the rotation of the cylinder the teeth lying at the upper portion thereof extend the required distance beyond the periphery of the cylinder to engage the straw and upon reaching a horizontal line extending through the cylinder in the vicinity of the shaft E, the bars carrying the teeth are drawn inward by the cam-track thereby also drawing the teeth inside the cylinder so that, practically, the under surface of the cylinder will have no projections sufficient to hold the straw which must readily fall to the ground.

The ends of said shaft E outside of the frame are each provided with a gear M. N is a gear rotatable with a ratchet wheel O on the stud C, said gearing being in mesh with the gear M, the carrying wheels B being furnished with one or more spring held pawls P which engage the ratchet wheel O and operate the same together with the gear N, furnishing a reverse direction of rotation for the gear M in the forward movement of the machine which in the drawing, Fig. 2, is toward the right or in the direction of the arrow. In said Fig. 2, the described pawls are shown in operative position at the ratchet wheel O, the near carrying wheel not being shown.

Q is a cylinder whose shaft Q′ is journaled on the frame rearward of the cylinder D. R is a sprocket wheel secured on each end of the shaft Q′ and S is a sprocket wheel on each end of the shaft E of the cylinder D. T is a sprocket chain trained over both wheels whereby the rotation of the shaft Q′ will be the same as that of the cylinder D or anti-clock-wise as viewed in said Fig. 2.

U indicates a series of teeth carried by the cylinder Q, the same being preferably curved backward or in a direction opposite that of rotation, the series of teeth of the two cylinders under normal operation rotating in fairly close proximity.

V is a shield overlying the cylinder Q, one extremity lying close to the latter in the space between the two cylinders and exposing the said teeth U, thence extending upwardly and rearwardly away from the cylinder and thence downward and secured on the frame. The shield is provided with openings $V^2$ whereby the teeth U can pass inward behind said shield, the latter acting as a stripper for the said teeth. $V^3$ is one of the several slots in the shield which permits vertical adjustment, bolts A′ securing the shield in a desired position.

As stated in the objects it is desired to adjust one of the cylinders in the direction of the other so that the thickness of the layer of straw laid down may be varied. This may be accomplished as shown herein as one of the possible ways of permitting this adjustment.

In Fig. 6 W indicates one of the bearings in which the shaft Q′ is mounted, said bearings being slidable upon the frame A which is vertically slotted at 2 to admit securing bolts 3. By loosening the bolts the shaft may be adjusted and then held in the desired position. The chain T may be of sufficient length to admit of the desired adjustment, there being an idler-wheel V′ adjustable vertically on the frame A in any good manner for loosening said chain or for taking it up. Other means may be provided, however, for obtaining this adjustment.

4 indicates a draft attachment for the front end of the frame A which may be secured to the under part of a wagon or rack indicated at 5 whose rear end may be opened into an inclosure 6 supported on the frame A, the rear wall of the rack indicated at 7 being preferably erected just above the said cylinder Q or over the shield V. The inclosure or hopper 6, is, as shown in Fig. 1, of greater length than the width of the wagon or rack 5, consequently the straw will be spread throughout a width in excess of the width of the wagon or rack 5, thus facilitating spreading.

8 indicates a series of teeth forming a basket for receiving the bulk of straw from the vehicle 5. These teeth are preferably secured at their forward ends to the inclosure 6, their free ends terminating near the cylinder D.

The material cast into the basket is carried over toward the rear wall 7 by the teeth G of the cylinder D, the said cylinder being filled therewith between its teeth to the depth of the latter, and combed by the teeth U of the cylinder Q. As the said teeth of the latter move in a direction contrary to the teeth G they remove the superfluous material from the cylinder D and prevent it bunching, allowing the discharge only of a uniform amount of material from end to end of the latter which is laid upon the ground in even layer. Said teeth U are stripped by the shield V and kept entirely free of the straw and from the fact that the teeth G are drawn inward after they pass the cylinder Q there is no chance for the straw to wrap about said cylinder D. Preferably the cylinder Q is rotated somewhat faster than cylinder D.

A projecting collar 9 is secured to each end of the last named cylinder and overlies the periphery of the plate K preventing wrapping of the straw thereupon, and all the gearing parts may be protected in any suitable manner so that the straw will not get into the same and interfere with the operation of the machine.

I provide the ratchet drive for both the wheels B in order that in turning around during operation there will always be one wheel in driving relation, the pawls of the lagging wheel being free to move over the teeth of its ratchet.

Though not shown, any clutch arrangement may be employed whereby to throw the machine out of gear, or the pawls P may be disengaged from the ratchet wheels to accomplish the same end, and any other structures may be provided for drawing the teeth G inward. The use of a cylinder such as D is always attended with the described disadvantage—that of long tough straw wrapping upon it and this is mainly due to the teeth which engage in the tangled straw effectually holding it. If, however, upon carrying the straw to the discharging position the teeth are drawn out of it, the ready discharge is the result. This is one of the important features in my construction and makes the machine operative with any kind of straw. If short brittle straw only were the rule, the disadvantages would not be so great and for handling fertilizers, which are usually well broken up, the trouble would almost entirely disappear.

The movement of the teeth U in the upward direction, within the inclosure 6 holds back the material as previously stated, keeping it thoroughly combed, so that straw cannot bunch and can only pass through of a depth substantially equal to the length of the teeth G according to the distance allowed between the two cylinders. The straw may be governed as to the depth it is laid upon the ground by the adjustment of the cylinders relatively for governing the amount permitted to pass between said cylinders.

The shafts of the cylinders are rotated at substantially the same speed but by reason of the fact that the cylinder D is greater in circumference its teeth will travel faster than those of the cylinder R and thus the combing will be more thorough than though the cylinders were of the same size.

Figure 8:
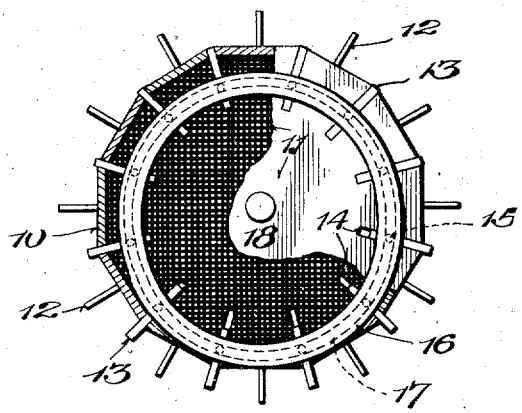
Fig. 8 is a modification of a cylinder and stripping means.

In Fig. 8 I have shown a modified form of means for stripping the material from the cylinder. 10 indicates the cylinder provided with a series of teeth 12 which, in this instance, are fixed. 13 represents a series of slats extending the full length of the cylinder, their ends projecting through the ends 11 of the cylinder between the teeth, the said ends of the cylinder having slots 14 to receive said slats. 15 indicates a series of rollers, one at each end of each slat, which lie in a groove 17 of a track portion 16 corresponding to the plate K, Figs. 3 and 4, though of somewhat different shape. In this form the outer edges of the said slats 13 are substantially flush at all times with the upper surface of the cylinder while at the under side of the cylinder the slats are designed to move outward after leaving a horizontal line carried through the shaft 18. In order that this action may result the track takes the position substantially as shown so that in the rotation of the cylinder the slats are projected and withdrawn and in being projected between the teeth act to push or strip the straw therefrom.

It is found that in addition to adjusting the cylinder Q to and from the cylinder D or 10, as the case may be, the vertical adjustment of the shield V is of considerable advantage. In certain kinds of straw the teeth U of the cylinder Q, if not sufficiently exposed, will permit the straw to form into a long tangled mass which will roll between the two cylinders without being discharged but by further exposing said teeth U the tangled mass will be combed and pulled apart so that the teeth of the large cylinder can then properly carry it through, the said teeth U being exposed or covered as required by the vertical adjustment of said shield.

I am familiar with various types of straw spreaders and fertilizers, some of which particularly in the latter class, employ rotating cylinders but the construction or arrangement of the parts is not such that the handling of straw is possible. In the present invention, the entire trailer attachment is a complete unit, *i e.*, the wheels B, serve to not only provide a traction means for the hopper, but also to operate the straw-spreading means. Thus, upon mere attachment of the trailer to the towing device (5) carrying the material supply, the entire device is in position for complete operation, *i. e.*, upon movement of the towing device, and supplying of the hopper with material from such device.

There are various types of straw spreaders using horizontal rotatable fans after the type of some forms of end gate seeders, and others employ a plurality of flexible traveling carriers to work in conjunction but all of these are found to produce indifferent results and are complicated whereas my machine is really quite simple and yields the desired results and requires for its operation, but little power in comparison with others.

I claim:

1. In a straw spreader, in combination, a receptacle for straw, a toothed straw-feeding cylinder located in the bottom thereof, a second toothed cylinder rotatably mounted adjacent thereto, also in the bottom of said receptacle, and means to rotate the cylinders in the same direction whereby the teeth at that side of the feeding cylinder adjacent the said second cylinder are rotated downward past said second cylinder, the teeth of the said feeding cylinder having a larger path of travel than those of the other.

2. In a straw spreader, the combination of a receptacle for the straw, a toothed cylinder rotatably mounted, a second smaller toothed rotatable cylinder mounted adjacent the first and adjustable in the direction of the same, both cylinders constituting part of the bottom of said receptacle, and gearing to rotate the said cylinders in the same direction, the teeth of the first named cylinder moving downward at that side adjacent the said second cylinder.

3. In a straw spreader, the combination of a frame, including an inclosure for the straw, a toothed cylinder rotatably mounted thereon, a second smaller toothed cylinder mounted adjacent the first, gearing to rotate the cylinders in the same direction, and stripping means lying tangentially to the periphery of the second cylinder and extending outside the path of its teeth for keeping the teeth of the said cylinder cleared of material.

4. In a straw spreader, the combination of a frame, a toothed cylinder rotatably mounted on said frame, means to retract its teeth during part of its rotation, a second toothed cylinder mounted adjacent the first, stripping means lying substantially tangentially to the periphery of the said cylinder, and means to drive the cylinders in the same direction.

5. In a straw spreader, the combination of a receptacle, a toothed cylinder rotatably mounted, a second toothed cylinder adjacent the first, the space between the cylinders constituting an outlet for the straw, the cylinders constituting part of the bottom of the receptacle, means to rotate the first named cylinder whereby its teeth pass downward at said outlet, and means to rotate the second cylinder whereby its teeth pass upward at said outlet, the first described cylinder being greater in diameter than the second one.

6. In a straw spreader, the combination of a receptacle, a toothed cylinder rotatably mounted, a second toothed cylinder adjacent the first, the space between the cylinders constituting an outlet for the straw, the cylinders constituting part of the bottom of the receptacle, means to rotate the first named cylinder whereby its teeth pass downward at said outlet, and means to rotate the second cylinder whereby its teeth pass upward at said outlet, one of the cylinders being adjustable in the direction of the other.

7. In a straw spreader, the combination of a receptacle, a toothed cylinder rotatably mounted, a second toothed cylinder adjacent the first, the space between the cylinders, constituting an outlet for the straw, the cylinders constituting part of the bottom of the receptacle, means to rotate the first named cylinder whereby its teeth pass downward at said outlet, and means to rotate the second cylinder whereby its teeth pass upward at said outlet, the first described cylinder being greater in diameter than the second one, one of the cylinders being adjustable in the direction of the other.

8. In a straw spreader, the combination of a frame, a toothed cylinder rotatably mounted on the frame adapted for receiving the straw, a second smaller toothed cylinder mounted adjacent the first in the rear thereof and adapted to operate in conjunction therewith, means to rotate both cylinders in the same direction, a covering for the second described cylinder adapted to clear the teeth thereof of accumulations, and a receptacle for the straw in which the first named cylinder partially lies.

9. In a straw spreader, in combination, a receptacle for straw, a toothed cylinder rotatably mounted with a portion thereof within said receptacle, a second smaller cylinder operating in conjunction with the first, means to rotate the cylinders, means to impart longitudinal movement to the fingers of the first cylinder during rotation whereby to expose them within the said receptacle and conceal them when outside the same.

10. In a straw spreader, in combination, a receptacle for straw, a toothed cylinder rotatably mounted with a portion thereof within said receptacle, a second cylinder operating in conjunction with the first, means to rotate the cylinders in the same direction, the fingers of the first cylinder during rotation being exposed within the said receptacle and substantially concealed when outside the same, stripping means lying tangentially to the periphery of the smaller cylinder through which the teeth pass.

11. In a straw spreader, in combination, a receptacle for the straw, a rotatable toothed cylinder lying partially inside and partially outside the same, and means to impart longitudinal movement to the teeth during rotation of the cylinder whereby said teeth are projected beyond that part of the periphery of said cylinder within the receptacle and retracted in at that part of the periphery outside said receptacle.

12. In a straw spreader, the combination of a receptacle for the straw, a cylinder rotatably mounted thereon provided with a series of teeth adapted during the rotation of said cylinder to move in the direction of their lengths, means to carry the teeth, means to impart rotation to the cylinder, and means adapted in said rotation to draw the teeth into the cylinder at that part outside the receptacle and project them from said cylinder at that part within the receptacle, a second toothed cylinder rearward of the first and means to rotate the cylinders in the same given direction, and stripping means for said second cylinder.

13. In a straw spreader, the combination of a frame, a cylinder rotatably mounted thereon, a series of teeth therefor adapted for longitudinal movement radially, a second toothed cylinder rearward of the first, the place of discharge of the straw lying between the two said cylinders, means to retract the teeth of said first cylinder at the lowermost side thereof and after passing said place of discharge in the rotation of the cylinder and project them at the upper portion, a stripping means for the teeth of the second described cylinder, and means to impart rotation to both cylinders in the same direction.

14. In a straw spreader, the combination with a frame, including an inclosure for holding the straw, and carrying wheels, of a toothed cylinder journaled on the frame, a second toothed cylinder rearward of the first, gearing for rotating the said first cylinder in a direction opposite to that of the carrying wheels whereby its teeth at the upper side move rearwardly and downwardly past the second said cylinder, and gearing to rotate the latter in the same direction as the first whereby its teeth adjacent the latter pass upwardly, and a stripping means for cleaning the teeth of said second cylinder.

15. In a straw spreader, the combination of a frame, a toothed cylinder rotatably mounted thereon, a second toothed cylinder mounted adjacent the first, means to rotate each of the cylinders in the same direction, and a shield overlying one of the cylinders and adapted for adjustment whereby to expose more or less of the teeth of the same.

16. In a straw spreader, the combination of a frame, a toothed cylinder rotatably mounted thereon, a second toothed rotatable cylinder mounted adjacent the first and adjustable relatively thereto, gearing to rotate the cylinders in a single given direction, and a shield overlying the second named cylinder and adapted for adjustment whereby to expose more or less of the teeth of the same.

17. A straw-spreading trailer attachment for wagons and the like, including a wheeled trailer frame, a hopper borne by the frame, straw advancing means associated with the hopper, means to actuate the straw-advancing means from the wheels of the wheeled frame, means coöperating with the advancing means and disposed adjacent thereto for acting upon the material in a direction opposed to the direction of feed of the material so as to comb and loosen the mass of material prior to its discharge from the hopper, and means whereby to attach said wheeled frame as a unit from a wagon or the like so as to effect movement of the straw advancing means upon movement of the wagon.

18. A straw-spreading trailer attachment for wagons and the like, including a wheeled trailer frame, a hopper borne by the frame, straw-advancing means associated with the hopper, means coöperating with the advancing means and disposed adjacent thereto for acting upon the material in a direction opposed to the direction of feed of the material so as to comb and loosen the mass of material prior to its discharge from the hopper, means to actuate the straw-advancing means, and means whereby to attach said wheeled frame as a unit from a wagon or the like.

19. A straw-spreading trailer attachment for wagons and the like, including a wheeled trailer frame, a hopper borne by the frame, straw-advancing means associated with the hopper, means to actuate the straw-advancing means, means coöperating with the advancing means and disposed adjacent thereto for acting upon the material in a direction opposed to the direction of feed of the material so as to comb and loosen the mass of material prior to its discharge from the hopper, means whereby to attach said wheeled frame as a unit from a wagon or the like, said hopper being of greater length than the width of the wagon whereby to obtain spreading of the straw throughout a width substantially equal to the length of the hopper.

In witness whereof, I have hereunto affixed my hand this 9th day of May, A. D. 1919.

MATHEW RAPP.